(12) United States Patent
Zhou et al.

(10) Patent No.: US 8,556,189 B2
(45) Date of Patent: Oct. 15, 2013

(54) CONDUCTIVE RAIL JOINT

(75) Inventors: Licheng Zhou, Jiangsu (CN); Yaping Yang, Jiangsu (CN)

(73) Assignee: Xin Yu Group Co., Ltd. (CN)

( * ) Notice: Subject to any disclaimer, the term of this patent is extended or adjusted under 35 U.S.C. 154(b) by 18 days.

(21) Appl. No.: 13/384,552

(22) PCT Filed: Feb. 1, 2010

(86) PCT No.: PCT/CN2010/000137
§ 371 (c)(1),
(2), (4) Date: Jan. 17, 2012

(87) PCT Pub. No.: WO2011/091554
PCT Pub. Date: Aug. 4, 2011

(65) Prior Publication Data
US 2012/0111957 A1    May 10, 2012

(51) Int. Cl.
*E01B 11/54* (2006.01)

(52) U.S. Cl.
USPC ........................................ 238/14.6; 191/22 R

(58) Field of Classification Search
USPC .................... 238/14.3, 14.4, 14.5, 14.6, 14.7;
191/22 R, 29 DM, 29 R, 32, 25, 40, 22 C
See application file for complete search history.

(56) References Cited

U.S. PATENT DOCUMENTS

| | | | | |
|---|---|---|---|---|
| 1,896,964 A | * | 2/1933 | Lind | 238/14.3 |
| 1,922,105 A | * | 8/1933 | Martin | 238/14.6 |
| 2,093,816 A | * | 9/1937 | Moak et al. | 238/14.6 |
| 2,598,101 A | * | 5/1952 | Baumann | 238/232 |
| 2,710,147 A | * | 6/1955 | Birchfield | 238/232 |
| 3,689,713 A | * | 9/1972 | Shkredka | 191/29 R |

(Continued)

FOREIGN PATENT DOCUMENTS

| | | |
|---|---|---|
| CN | 1571739 A | 1/2005 |
| CN | 2925957 Y | 7/2007 |

(Continued)

OTHER PUBLICATIONS

International Search Report dated Nov. 11, 2010 from International Patent Application No. PCT/CN2010/000137 filed Feb. 2, 2010 (5 pages).

*Primary Examiner* — Jason C Smith
(74) *Attorney, Agent, or Firm* — Schmeiser, Olsen & Watts LLP

(57) ABSTRACT

A conductive rail joint comprises a left conductive rail (1), a middle rail (2), a right conductive rail (3), supporting plates (4), electric conductors (5) and conductive wires (6). The opposite end faces of the three rails are slant and parallel with each other. The supporting plates (4), the electric conductors (5) and the conductive wires (6) respectively consist of a left one and a right one. The two supporting plates are axial non-symmetrically mounted at the bottom of the corresponding conductive rails (1, 3) respectively. One end of each electric conductor (51, 52) is fixed to the corresponding supporting plate (41, 42) and the other end is suspended. Each of the two conductive wires (61, 62) is connected between the fixed end of the corresponding electric conductor (51, 52) and the suspended end of the other electric conductor (52, 51). The conductive wires (6) are loose after the connection. The conductive wires (6) and the electric conductors (5) consist of a loop so that when the conductive rails are expanded or contracted, the longitudinal displacements of the two conductive rails are not restricted.

9 Claims, 5 Drawing Sheets

(56) References Cited

U.S. PATENT DOCUMENTS

| | | | |
|---|---|---|---|
| 3,790,725 A * | 2/1974 | Charamel et al. | 191/29 R |
| 5,224,575 A * | 7/1993 | Plichta | 191/22 R |
| 5,617,796 A * | 4/1997 | Trenner et al. | 104/106 |
| 5,865,282 A * | 2/1999 | Gluck | 191/22 DM |
| 7,703,589 B2 * | 4/2010 | Kalitzki | 191/32 |
| 2004/0168873 A1* | 9/2004 | Nunlist et al. | 191/22 R |
| 2004/0251103 A1* | 12/2004 | Schroder et al. | 191/22 R |
| 2009/0120753 A1* | 5/2009 | Kalitzki | 191/32 |
| 2011/0278120 A1* | 11/2011 | Kaufold et al. | 191/22 R |
| 2012/0111957 A1* | 5/2012 | Zhou et al. | 238/14.6 |

FOREIGN PATENT DOCUMENTS

| | | |
|---|---|---|
| CN | 201009769 Y | 1/2008 |
| DE | 3306117 A1 | 8/1984 |
| FR | 2258978 A1 | 8/1975 |
| JP | 5-72555 U | 7/1993 |

* cited by examiner

CONDUCTIVE RAIL JOINT

FIELD OF THE INVENTION

The present invention relates to a conductive rail joint.

BACKGROUND OF THE INVENTION

In the power supply system for electric vehicles in an urban subway system, the conductive rail traction power supply technology is often used to reduce the construction cost of line construction. The so-called "conductive rail traction power supply" is to add a charged rail, besides the two rails for train running. The charged rail is usually located between the two rails or at the outside of one rail. The collector shoes of current collecting equipment of the electric trains contact with and slide on the charged conductive rail, so as to transmit the electric power to the train.

At present, all existing conductive rails are steel-aluminum compound rails, and single conductive rail usually has a length of 12-20 meters. Therefore, a plurality of conductive rails must be connected with each other electrically and mechanically, in order to provide electric energy for the electric train. Like all rails, conductive rails expand with heat and contract with cold with following temperature change. Therefore, appropriate clearance must be arranged between the ends of two adjacent conductive rails. To achieve electric connection between two adjacent conductive rails, a telescopic conductive joint must be installed at the joint of the two conductive rails when laying conductive rails, and the conductive joint must have low contact resistance, high reliability, and be easy to install, etc.

In the past, conductive rails are electrically connected to each other through the connection of fish plates at both ends of the conductive rail. To improve reliability of the electric connection, an expansion joint is added at the joint of the conductive rails nowadays.

In the prior patent application No. CN200720036403.7, "Conductive Rail Compensation Apparatus for Rail Transit", an expansion joint composed of three silver-plated copper plates (primary and secondary plates) that can slide relatively to each other is disclosed. The primary and secondary plates of the expansion joint are fixed to the conductive rails, with the primary plate being inserted between the two secondary plates, and these plates are fixed with a U-bolt fixture with a backing plate. Springs are arranged on the U-bolts, and the primary and secondary plates achieve conducting function by planar frictional contact. However, such an expansion joint has some drawbacks in actual application, mainly including: the contact resistance between primary plate and secondary plate is not easy to control, that is to say, the vibrations and change of local temperature generated during train operation, abrasion and erosion of primary and secondary plates, intrusion of foreign matters, and change of clamping force, etc., will result in change of the contact resistance; (2) the bolt torque is difficult to control: if the bolt torque is too large, the pressing force between primary and secondary plates will be too large, and therefore the expansion joint can't expand and contract smoothly, thus during deformation of expansion or contraction of the conductive rail, large resistance force will be generated which may even result in deformation of the conductive rail; if the pressing force is not large enough, the primary and secondary plates can not get in good contact with each other, and therefore the contact resistance will increase and result in adverse effect to current-carrying; (3) due to the fact that some voltage drop exists at the contact point or contact surface between the primary and secondary plates, phenomena such as overheat or arc ablation may occur when the contact resistance is too large or the contact is not good. In the prior patent with No. ZL02820582.0, "Telescopic Connector for Conductive Rails), a telescoping connector that employs a multi-layer metal conductor is disclosed. In the embodiments, flexible connection of multi-layer metal straps with superior electric conductivity is mainly used. The electric conductive metal strap is fixed to connection elements, which are made of non-metal materials, and can be mounted in or on the opposite ends of contact rails (conductive rails) in a movable or slideable manner, to ensure the conductive rails only expand and contract along the length direction. However, when the conductive rails expand or contract in the longitudinal direction, it is difficult to maintain balance of frictional resistance forces in the sliding grooves on both ends of the connecting elements. In addition, the multi-layer metal strap has a certain degree of rigidity. Therefore, when the contact rails expand or contract, it is difficult to ensure a uniform and even compression or extension journey for the curved parts on the two sides, for example, the expansion/contraction range on one side may obviously asymmetric to that on the other side, or the curved part on the side of the electric conductor is excessively compressed or extended repeatedly, resulting in fatigue damage or even fracture of parts of the metal straps. In extreme cases, for example, only the curved part on the side of the conductive body expands or contracts and results in excessive elastic deformation of the curved part, the conductive body may further come into contact with the ground or the bottom of conductive rail, causing a potential safety hazard or safety accident.

SUMMARY OF THE INVENTION

The object of the present invention is to provide a conductive rail joint, which ensures not only accurate guiding of the left and right conductive rails during heat-expansion and clod-contraction but also ensure good current continuation, namely, electric energy transmission can be assured even there is a break point in the loop.

To achieve the object of the present invention, the following technical scheme is employed: a conductive rail joint, including a left conductive rail, a middle rail, and a right conductive rail, wherein, the right end face of the left conductive rail, both end faces of the middle rail, and left end face of the right conductive rail are inclined planes parallel with each other; the conductive rail joint further includes supporting plates, electric conductors, and conductive wires; the supporting plates comprise a left supporting plate mounted on the bottom of the left conductive rail and a right supporting plate mounted on the bottom of the right conductive rail, the left and right supporting plates are mounted in a axial asymmetric manner; the electric conductors comprise left electric conductor and right electric conductor, wherein, the left end of the left electric conductor is fixed to the left supporting plate, and its right end is suspended; the right end of the right electric conductor is fixed to the right supporting plate, and its left end is suspended; the conductive wires comprise a left conductive wire and a right conductive wire, wherein, both ends of the left conductive wire are connected to the fixed end of the left electric conductor and the suspended end of the right electric conductor respectively, and both ends of the right conductive wire are connected to the suspended end of the left electric conductor and the fixed end of the right electric conductor; the conductive wires can remain loose after connection.

The supporting plates are connected to the left conductive rail and right conductive rail by welding or riveting.

The electric conductors are fixed to the supporting plates by bolts, and the conductive wires are fixed to the electric conductors by bolts.

The supporting plates are made of metal material that has good electrical conductivity, weldability and enough mechanical strength.

The electric conductors are copper bars with good electrical conductivity.

The conductive wires are braided annealed copper wires.

The present invention further includes fishplates, wherein, left horizontal regulation hole and right horizontal regulation hole are arranged in the middle part of left conductive rail and right conductive rail respectively, and fixing holes are arranged in the middle part of the middle rail; the fishplates are mounted on both sides of middle part of left conductive rail, middle rail, and right conductive rail via bolts, left horizontal regulation hole, right horizontal regulation hole and fixing holes, and the fishplates are connected to the left conductive rail and right conductive rail in a slideable manner and connected to the middle rail in a fixed manner.

The fishplates are made of aluminum alloy material, and the bolts for mounting fishplates are made of stainless steel material.

The fishplates and bolts participate in the electric connection of the conductive rails.

The present invention has the following beneficial effects:

(1) The two ends of the left conductive wire are connected to the fixed end of the left electric conductor and suspended end of the right electric conductor respectively, and the two ends of the right conductive wire are connected to the suspended end of the left electric conductor and fixed end of the right electric conductor; with such a structure, the conductive wires and electric conductors form a loop, so that during the expansion or contraction of conductive rails, the longitudinal displacements of the left and right conductive rails are not restricted; the left and right conductive wires are fixed to the left and right electric conductors by bolts and nuts respectively, and there is no obvious relative movement between all electric connection points; therefore, during the service life of the expansion joint, environmental factors such as mechanical vibration, electromagnetic force, thermal stress cycle, erosion by the atmospheric environment, and dust contamination, etc., will not significantly affect the contact resistance at each electric connection point.

(2) The conductive wires of the present invention remain loose after connection, and therefore will not hinder the free expansion and contraction of the conductive rails during expansion caused by heat and contraction caused by cold; in addition, since both ends of the conductive wires are fixed to the electric conductors and the two electric conductors are located on the same horizontal plane, the conductive wires will bend only in the horizontal plane, and will not come into contact with the ground due to deformation.

(3) In the present invention, the electric conductors are fixed to the supporting plates by bolts and the conductive wires are fixed to the electric conductors by bolts; such a structure facilitates assembling, disassembling, and replacement.

(4) The supporting plates in the present invention are made of metal material that has good electrical conductivity, weldability, and enough mechanical strength, and are integrated with the conductive rails by welding or riveting; therefore, the structure is stable and the electric conduction is highly reliable.

(5) The electric conductors in the present invention are made of copper bars with good electrical conductivity; such a structure further improves reliability of electric conduction.

(6) The conductive wires in the present invention are braided annealed copper wires, which are very flexible and fracture-resistant; therefore, the conducting loop is more stable and reliable.

(7) The fishplates in the present invention are mounted on both sides of waist of the left conductive rail, middle rail, and right conductive rail via bolts, waist-shaped round holes, and fixing holes, wherein the fishplates are connected to the left conductive rail and right conductive rail in a slideable manner and connected to the middle rail in a fixed manner; in such a structure, the left conductive rail and right conductive rail will expand or contract toward the middle rail during expanding with heat and contracting with cold, and therefore further improve the stability and reliability of the conductive loop.

(8) In the present invention, both the fishplates and the bolts for mounting fishplate are made of metal material with enough mechanical strength; thus, when the left conductive rail and right conductive rail expand or contract in longitudinal direction during expanding with heat and contracting with cold, the fishplates and the bolts for mounting fishplate can ensure accurate guiding when the conductive rails slide.

(9) In the present invention, both the fishplates and the bolts for mounting fishplate participate in the electric connection of the conductive rails, and therefore can ensure reliability of electric connection more effectively.

BRIEF DESCRIPTION OF THE DRAWINGS

In order to understand the content of the present invention more clearly, hereunder the present invention will be further described according to embodiments, with reference to the accompanying drawings, wherein.

In the drawings.

Figure 1:
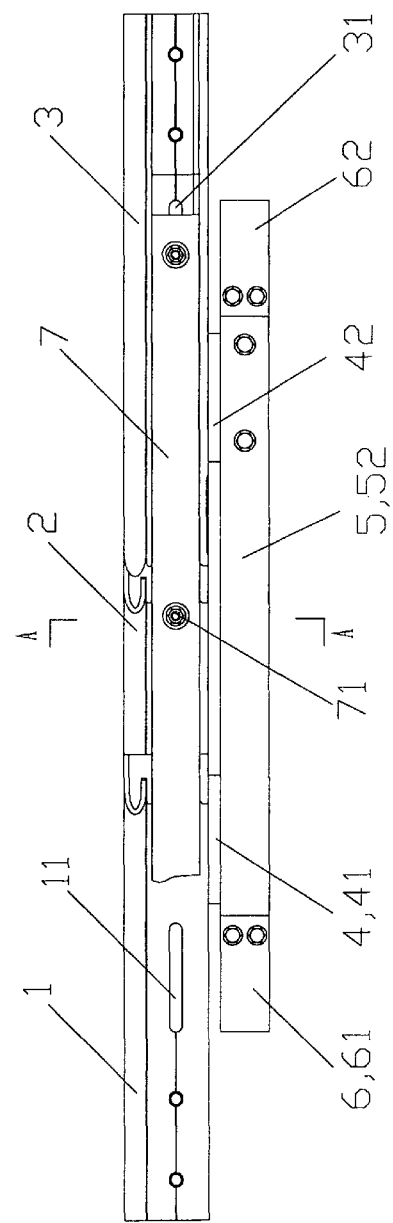
FIG. 1 is a structural schematic diagram of the present invention.

1—left conductive rail, 11—left horizontal regulation hole, 2—middle rail, 21—contact surface, 3—right conductive rail, 31—right horizontal regulation hole, 4—supporting plates, 41—left supporting plate, 42—right supporting plate, 5—electric conductors, 51—left electric conductor, 52—right electric conductor, 6—conductive wires, 61—left conductive wire, 62—right conductive wire, 7—fishplates, 71—bolts, 8—fixing holes.

EMBODIMENTS

Example 1

With reference to FIGS. 1-5, the present example includes left conductive rail 1, middle rail 2, right conductive rail 3, supporting plates 4, electric conductors 5, conductive wires 6, and fishplates 7.

Figure 2:
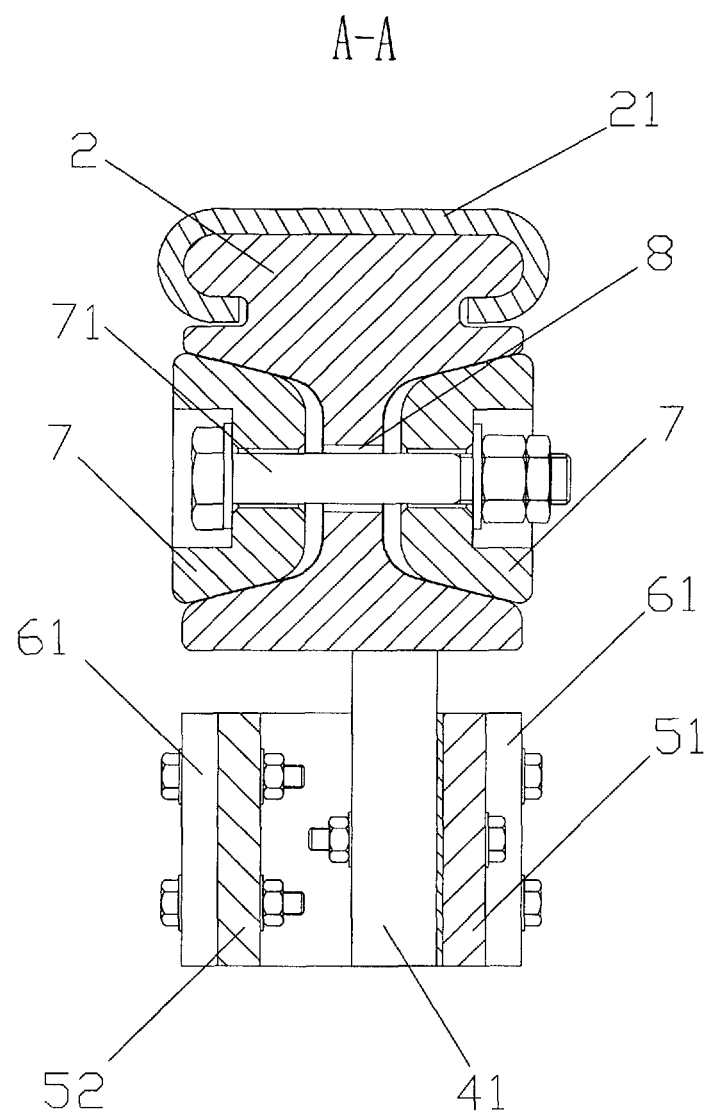
FIG. 2 is an A-A sectional view of FIG. 1.
Figure 3:
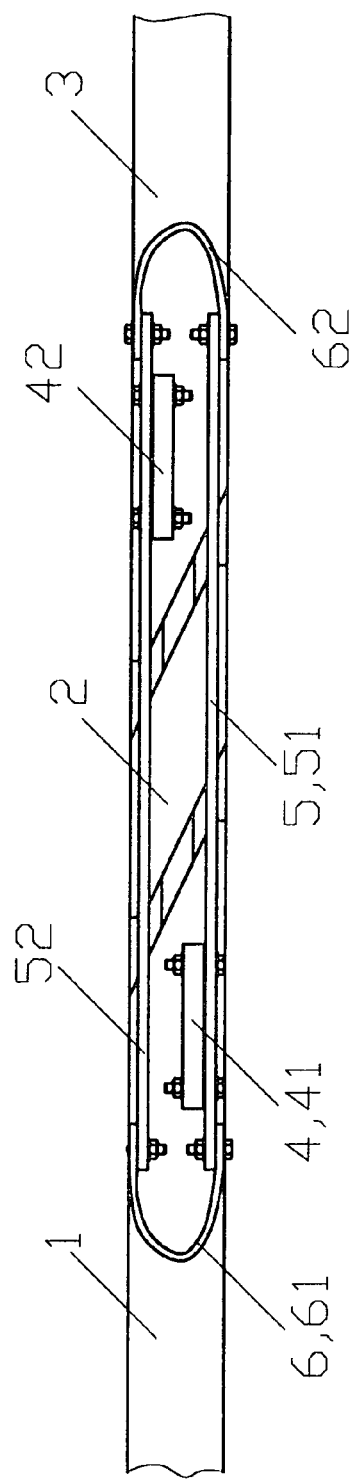
FIG. 3 is a schematic diagram of conductive rails without expansion/contraction at normal temperature in the present invention.
Figure 4:
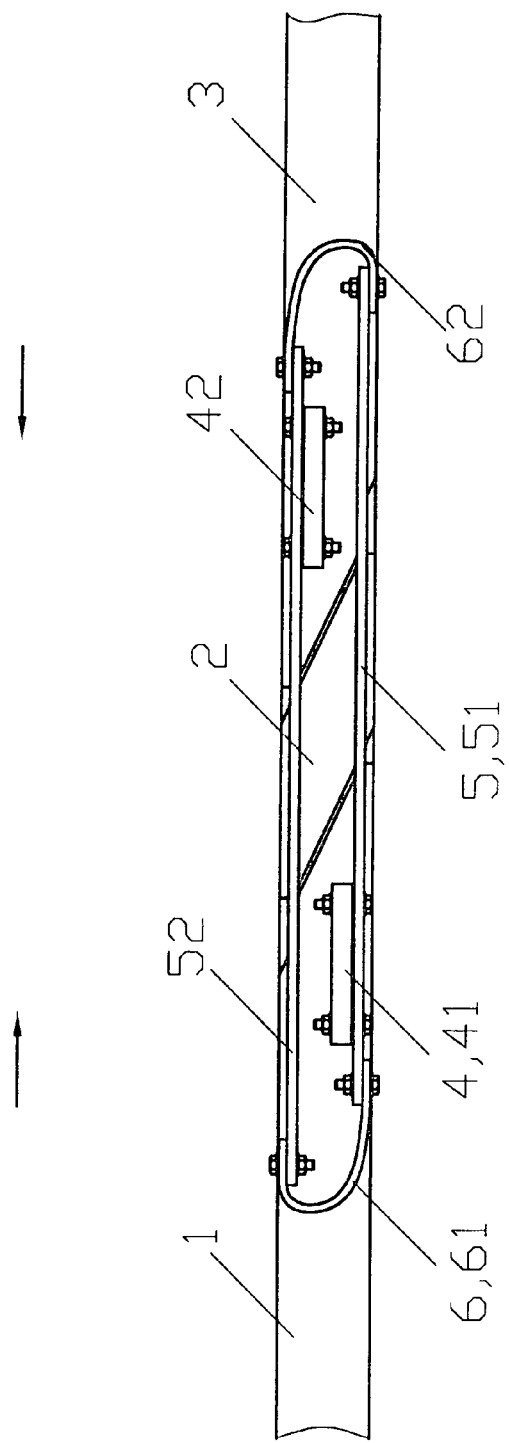
FIG. 4 is a schematic diagram of the conductive rails in expansion state due to temperature rise in the present invention.
Figure 5:
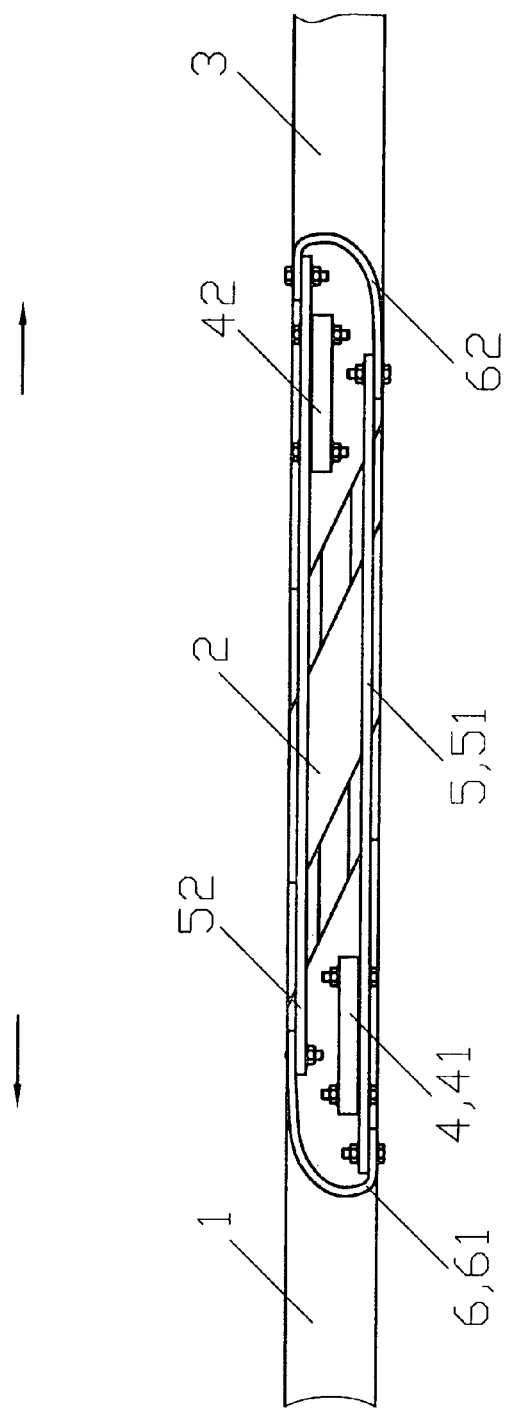
FIG. 5 is a schematic diagram of the conductive rails in contraction state due to temperature fall in the present invention.

The left conductive rail, right conductive rail, and middle rail all have a I-shaped cross section, and have contact surfaces at the top, for example contact surface 21 of middle rail as illustrated in FIG. 2. The collector shoes of the electric vehicle slide on the contact surface to receive current. The right end face of left conductive rail 1, two end faces of middle rail 2, and left end face of right conductive rail 3 are slants parallel with each other. The supporting plates 4 are made of metal material that has good electrical conductivity, weldability, and enough mechanical strength, and are comprised of a left supporting plate 41 mounted on the bottom of the left conductive rail 1 and a right supporting plate 42 mounted on the bottom of the right conductive rail 3 by welding or riveting; the two supporting plates 41 and 42 are mounted in an asymmetric manner, i.e., there is a certain height difference between them, as shown in FIGS. 3-5. The electric conductors 5 are made of copper bars with good electrical conductivity, and are comprised of a left electric conductor 51 and a right electric conductor 52, wherein, the left end of the left electric conductor 51 is fixed to the left supporting plate 41 and its right end is suspended, the right end of the right electric conductor 52 is fixed to the right supporting plate 42 and its left end is suspended; the conductive wires 6 are braided annealed copper wires, and are comprised of a left conductive wire 61 and a right conductive wire 62, wherein, two ends of the left conductive wire 61 are connected to the fixed end of the left electric conductor 51 and the suspended end of the right electric conductor 52 respectively, and two ends of the right conductive wire 62 are connected to the suspended end of the left electric conductor 51 and the fixed end of the right electric conductor 52 respectively; the conductive wires 6 remains loose after connection. Waist-shaped round left horizontal regulation hole 11 and right horizontal regulation hole 31 are arranged in the middle part of left conductive rail 1 and right conductive rail 3 respectively, and fixing holes 8 are arranged in the middle part of middle rail 2; the fishplates 7 are mounted on both sides of the middle part of left conductive rail 1, middle rail 2, and right conductive rail 3 via the bolts 71, left horizontal regulation hole 11, right horizontal regulation hole 31, and fixing holes 8; the fastening torque of the bolt 71 and nut fastened on the middle rail 2 is large, while the fastening torque of the bolt 71 and nut that are connected with the left and right conductive rails 1, 3 is small; thus, the bolts on both sides can slide in longitudinal direction in the left horizontal regulation hole 11 and right horizontal regulation hole 31 respectively, so that the fishplates 7 are connected with the left conductive rail 1 and right conductive rail 3 in a slideable manner and connected with the middle rail 2 in a fixed manner.

This embodiment is mainly used in the power supply system for urban rail. The joints of the left and right conductive rails 1, 3 and middle rail 2 are designed as slants parallel with each other; thus, the contact surfaces of the conductive rails are continuous, and the clearance is adjustable and can be overlapped, so that the collector shoes can transit from one end to the other end smoothly when they pass through the clearance between the conductive rail joints. Therefore, arc generation on the collector shoes during transition at the expansion points can be eliminated. The ends of the left conductive rail 1 and right conductive rail 3 are connected, to improve reliability of electric energy transmission through the conductive rails. Such an expandable conductive rail joint has simple structure and is easy to disassemble and assemble, and the electric conductors 5 and conductive wires 6 can be fixed simply with several bolts. Since the electric conductors 5 and conductive wires 6 form a loop, the reliability is very high. The electric energy transmission can be ensured even if a break point occurs in the loop. Moreover, both the fishplates 7 and the bolts 71 for mounting fishplate participate in the electric connection of the conductive rails so as to ensure reliability of the connection more effectively. The conductive wires 6 are braided annealed copper wires, which are very flexible and will not hinder the free expansion and contraction of the conductive rails when the conductive rails expand with heat and contract with cold; since both ends of the conductive wires 6 are fixed to the electric conductors 5 and the two electric conductors 5 are on the same horizontal plane, therefore, the conductive wires 6 will bend only in the horizontal plane, and will not come into contact with the ground due to deformation.

Please see FIG. 4. When the temperature rises, the left conductive rail 1 and right conductive rail 3 expands, and the left electric conductor 51 and right electric conductor 52 move relatively to each other; since the conductive wires 6 are braided annealed copper wires, which are very flexible, they will not hinder the expansion of the conductive rails during temperature rise.

Similarly, as shown in FIG. 5, when the temperature drops, the left conductive rail 1 and right conductive rail 3 contracts, and the left electric conductor 51 and right electric conductor 52 also move relatively to each other; since the conductive wires 6 are braided annealed copper wires, which are very flexible, they will not hinder the contraction of the conductive rails during temperature drop.

It should be appreciated that the embodiments described above are only provided to illustrate the present invention but are not intended to make any limitation to the present invention. Any change or modification made without departing from the spirit of the present invention shall be deemed as falling into the protected scope of the present invention.

The invention claimed is:

1. A conductive rail joint comprising,
a left conductive rail extending in a first direction and having a right end face that is oblique to the first direction;
a middle rail having a first end face and an opposing second end face;
a right conductive rail extending in the first direction and having a left end face oblique to the first direction, wherein the right end face of the left conductive rail is parallel to the first end face of the middle rail and the left end face of the right conductive rail is parallel to the second end face of the middle rail;
supporting plates, having a left supporting plate mounted on a bottom of the left conductive rail and a right supporting plate mounted on a bottom of the right conductive rail, wherein the left and right supporting plates are mounted in an axial asymmetrical manner;
electric conductors having a first electric conductor and a second electric conductor, wherein a first end of the first electric conductor is fixed to the left supporting plate and a second end of the first electric conductor is suspended, and wherein a first end of the second electric conductor is fixed to the right supporting plate and a second end of the second electric conductor is suspended; and
conductive wires having a left conductive wire having a first and a second end and a right conductive wire having a first and a second end, wherein the first end of the left conductive wire is connected to the first end of the first electric conductor and the second end of the left conductive wire is is connected to the second end of the second electric conductor, and the first end of the right conductive wire is connected to the second end of the first electric conductor and the second end of the right conductive wire is connected to the first end of the second electric conductor, the conductive wires remain loose after connection.

2. The conductive rail joint according to claim 1, wherein the supporting plates are connected to the left conductive rail and the right conductive rail by welding or riveting.

3. The conductive rail joint according to claim 2, wherein the electric conductors are fixed to the supporting plates by bolts, and the conductive wires are connected to the electric conductors by bolts.

4. The conductive rail joint according to claim 3, wherein the supporting plates are made of metal material.

5. The conductive rail joint according to claim 4, wherein the electric conductors are made of copper bars.

6. The conductive rail joint according to claim 5, wherein the conductive wires are braided annealed copper wires.

7. The conductive rail joint according to claim 6, further comprising fishplates, wherein a left horizontal regulation hole is arranged in a middle part of the left conductive rail and a right horizontal regulation hole is arranged in a middle part of the right conductive rail, wherein fixing holes are arranged in a middle part of the middle rail, and the fishplates are mounted on both sides of the middle part of the left conductive rail, the middle rail, and the right conductive rail via (i) bolts, (ii) left horizontal regulation hole, (iii) right horizontal regulation hole, and (iv) fixing holes, and wherein the fishplates are connected with the left conductive rail and right conductive rail in a slideable manner, and connected with the middle rail in a fixed manner.

8. The conductive rail joint according to claim 7, wherein the fishplates are made of aluminum alloy material, and the bolts for mounting the fishplates are made of stainless steel material.

9. The conductive rail joint according to claim 8, wherein the fishplates and the bolts participate in the electric connection of the conductive rails.

* * * * *